United States Patent
Cho et al.

(10) Patent No.: US 8,948,528 B2
(45) Date of Patent: Feb. 3, 2015

(54) METHOD AND APPARATUS FOR RESTORING IMAGE BY COPYING MEMORY

(75) Inventors: Jin Soo Cho, Seoul (KR); Gi Ho Park, Seoul (KR); Won Chang Lee, Seongnam-si (KR); Shi Hwa Lee, Seoul (KR); Do Hyung Kim, Hwaseong-si (KR); Joon Ho Song, Hwaseong-si (KR)

(73) Assignees: Samsung Electronics Co., Ltd., Suwon-Si (KR); Industry-Academia Cooperation Group of Sejong University, Seoul (KR)

( * ) Notice: Subject to any disclaimer, the term of this patent is extended or adjusted under 35 U.S.C. 154(b) by 142 days.

(21) Appl. No.: 13/605,432

(22) Filed: Sep. 6, 2012

(65) Prior Publication Data

US 2013/0064463 A1   Mar. 14, 2013

(30) Foreign Application Priority Data

Sep. 14, 2011   (KR) ................. 10-2011-0092593

(51) Int. Cl.
*G06K 9/46*   (2006.01)
*G06K 9/36*   (2006.01)
*G06K 9/40*   (2006.01)
*H04N 7/01*   (2006.01)
*G06T 7/20*   (2006.01)

(52) U.S. Cl.
CPC ............ *H04N 7/0137* (2013.01); *G06T 7/2013* (2013.01); *G06T 2207/10016* (2013.01); *G06T 2207/20224* (2013.01)
USPC .......................................... 382/236; 382/254

(58) Field of Classification Search
None
See application file for complete search history.

(56) References Cited

U.S. PATENT DOCUMENTS

| 7,289,673 B2 * | 10/2007 | Lin et al. ..................... 382/236 |
| 2006/0067406 A1 * | 3/2006 | Kitada et al. ............. 375/240.16 |
| 2007/0217702 A1 | 9/2007 | Sung |
| 2008/0181308 A1 * | 7/2008 | Wang et al. ............. 375/240.16 |
| 2012/0243611 A1 * | 9/2012 | Kondo ..................... 375/240.16 |

FOREIGN PATENT DOCUMENTS

| JP | 2006-101405 | 4/2006 |
| KR | 10-2008-0052344 | 6/2008 |
| KR | 10-2009-0039680 | 4/2009 |

* cited by examiner

*Primary Examiner* — Bhavesh Mehta
*Assistant Examiner* — Feng Niu
(74) *Attorney, Agent, or Firm* — Staas & Halsey LLP (57) ABSTRACT

A method and apparatus for restoring an image by copying a memory may include determining whether to perform an interpolation operation based on block information, and restoring a current image using a reference image depending on whether to perform the interpolation operation.

17 Claims, 6 Drawing Sheets

METHOD AND APPARATUS FOR RESTORING IMAGE BY COPYING MEMORY

CROSS-REFERENCE TO RELATED APPLICATIONS

This application claims the benefit of Korean Patent Application No. 10-2011-0092593, filed on Sep. 14, 2011, in the Korean Intellectual Property Office, the disclosure of which is incorporated herein by reference.

BACKGROUND

1. Field

Example embodiments of the following description relate to an image restoration method and apparatus that may reduce an external memory bandwidth during restoring of a current image.

2. Description of the Related Art

In general, when a current image is restored, motion compensation may cause a large number of requests for a memory. In particular, when a large amount of data flows between a processor and a memory, a setting latency and an access latency of a Direct Memory Access (DMA), and a data transmission time may be increased, which may result in a reduction in a performance of a system.

During restoration of a current image, an optimal mode may be determined based on a motion vector and a reference image that are associated with the current image. Additionally, a skip mode may be determined for each of the blocks that form the current image. A mode of the current image may be determined to be a skip mode, when the following requirements are satisfied.

Specifically, when 1) a motion compensation block has a size of "16×16," 2) a previous image immediately preceding the current image is used as a reference image, 3) a motion vector in "16×16" mode is identical to a motion vector of the skip mode, 4) a number of bits of residual data is "0" or an approximate value of "0," the current image may be determined to be in the skip mode. In the skip mode, since the number of bits of residual data is "0" or an approximate value of "0," there may be almost no difference between the current image and a predicted image, or the current image and the predicted image may be the same.

When the current image is in the skip mode, a conventional memory system may read pixel data of a reference image from a memory, without changing the pixel data. In other words, in the skip mode, the conventional memory system may compare parameters to perform an interpolation operation on the pixel data of the reference image. Additionally, when the pixel data of the reference image remains unchanged as a result of the comparing of the parameters, the conventional memory system may store the pixel data of the reference image as a current image.

Accordingly, even when an operation of changing the pixel data of the reference image is not performed, the conventional memory system may read the reference image and compare the parameters, and accordingly a bandwidth between a processor and a memory may be wasted. The operation of changing the pixel data of the reference image may include, for example, an operation of generating a predicted image, an operation of generating a residual image, and the like. In other words, due to the interpolation operation performed during motion compensation of a current image, a memory bandwidth of a Digital Signal Processor (DSP) may be wasted even when pixel data is not substantially changed.

Thus, there is a desire for a technology that may prevent a bandwidth of the DSP from being wasted when the interpolation operation, such as an operation of changing pixel data of a reference image, is not substantially performed during motion compensation.

SUMMARY

The foregoing and/or other aspects are achieved by providing a method for restoring an image, the method possibly including determining whether to perform an interpolation operation based on block information of a current image, and restoring the current image by copying a reference image to the current image based on a determination result, the reference image being stored in a memory.

The determining may include deciding to skip loading of the reference image, generating of a predicted image, applying of a weight, and generating of a residual image, and to restore the current image, based on the block information.

The block information may include at least one of motion information, weight information, skip mode information, and reference image information that are associated with the current image.

The restoring may include copying the reference image to a memory address of the current image assigned in the memory, based on the reference image information and the motion information.

The determining may include determining whether to load the reference image based on the motion information and a reference value.

The determining may include, when a pixel value corresponding to motion information of the current image is already stored, determining whether to perform the interpolation operation based on weight information and skip mode information that are associated with the current image.

The determining may include determining whether motion information of the current image corresponds to a reference value, determining whether to apply a weight to the current image based on weight information of the current image when it is determined that the motion information corresponds to the reference value, determining whether a value of a coded block pattern corresponding to skip mode information of the current image is equal to or less than a reference pattern value when it is determined not to apply the weight, and deciding to skip the interpolation operation of the current image and to restore the current image, when it is determined that the value of the coded block pattern is equal to or less than the reference pattern value.

The foregoing and/or other aspects may be achieved by providing an apparatus for restoring an image, the apparatus possibly including an operation determination unit to determine whether to perform an interpolation operation based on block information of a current image, a memory to store the current image and a reference image associated with the current image, and a restoring unit to restore the current image by copying the stored reference image to the current image based on a determination result.

The operation determination unit may decide to skip loading of the reference image, generating of a predicted image, applying of a weight, and generating of a residual image, and to restore the current image, based on the block information.

The restoring unit may copy the reference image to a memory address of the current image assigned in the memory, based on the reference image information and the motion information.

The skip mode information may be generated based on a coded block pattern of the current image. The operation determination unit may determine whether to generate a residual image based on the coded block pattern and a reference pattern value.

The operation determination unit may include a motion information analyzing unit to determine whether motion information of the current image corresponds to a reference value, a weight applying unit to determine whether to apply a weight to the current image based on weight information of the current image, when it is determined that the motion information corresponds to the reference value, and a block pattern analyzing unit to determine whether a value of a coded block pattern corresponding to skip mode information of the current image is equal to or less than a reference pattern value, when it is determined not to apply the weight, and to determine whether to skip the interpolation operation of the current image and to restore the current image, based on a result of determining whether the value of the coded block pattern is equal to or less than the reference pattern value.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
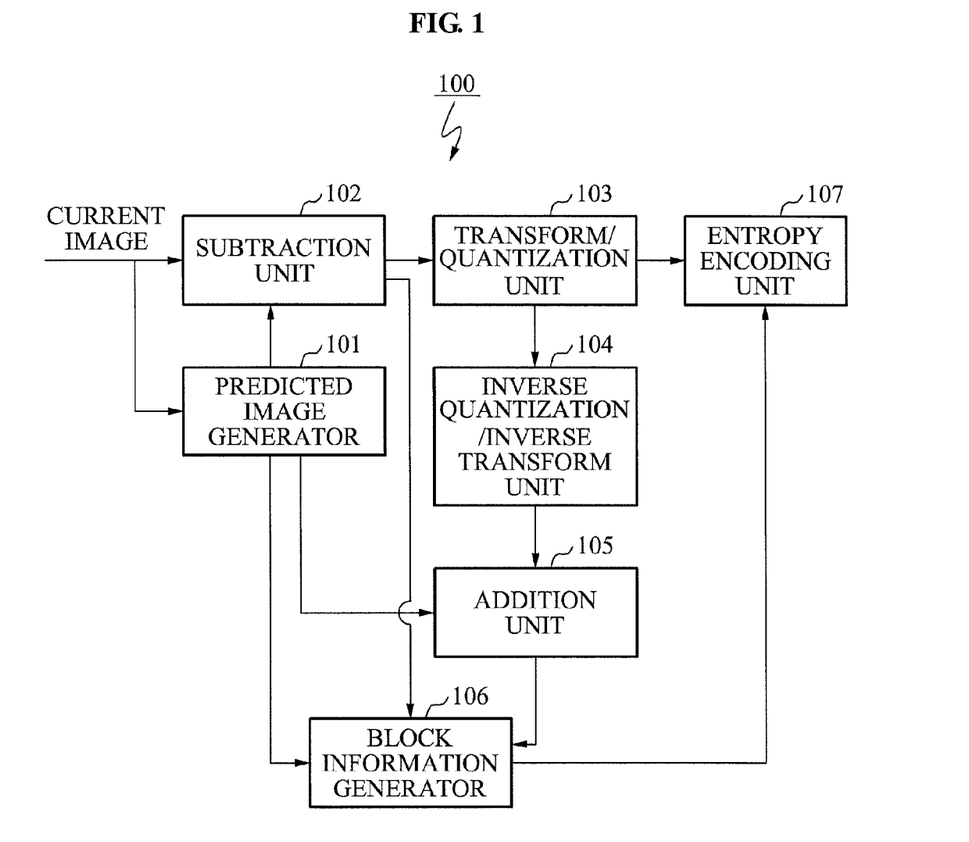
FIG. 1 is a block diagram of a configuration of an image coding apparatus according to example embodiments.

FIG. 1 is a block diagram of a configuration of an image coding apparatus 100 according to example embodiments.

Referring to FIG. 1, the image coding apparatus 100 may include a predicted image generator 101, a subtraction unit 102, a transform/quantization unit 103, an inverse quantization/inverse transform unit 104, an addition unit 105, a block information generator 106, and an entropy encoding unit 107.

The predicted image generator 101 may generate a predicted image of a current image using a reference image. The reference image may include, for example, previous frames that are continuously input prior to the current image. For example, when the current image includes macroblocks, a neighboring block around the current image may be used as a reference image.

Subsequently, the predicted image generator 101 may generate a predicted image by performing an intra prediction or an inter prediction with respect to the reference image.

In an example in which the intra prediction is performed, the predicted image generator 101 may generate a predicted image using values of spatially neighboring pixels to encode blocks of the current image.

In another example in which the inter prediction is performed, the predicted image generator 101 may calculate a motion vector using various motion estimation algorithms, such as, for example, a Block Matching Algorithm (BMA), a phase correlation algorithm, a Hierarchical Search Block Matching Algorithm (HSBMA), and the like. Additionally, the predicted image generator 101 may generate a predicted image, namely a prediction value of the current image, based on the motion vector.

In this example, the predicted image generator 101 may generate motion information of the current image based on the motion vector. Additionally, the predicted image generator 101 may generate reference image information based on an identification (ID) number of the reference image used to generate a predicted image.

The subtraction unit 102 may generate a residual image using the current image and the predicted image. Specifically, the subtraction unit 102 may subtract the predicted image from the current image, and may generate a residual image. When a subtraction result value is "0" or is equal to or less than a reference pattern value, the predicted image may be substantially similar to, or the same as the current image. For example, a coded block pattern may be used as the subtraction result value.

The transform/quantization unit 103 may perform a Discrete Cosine Transform (DCT) on the residual image, may quantize the residual image, and may generate a quantized transform coefficient. Additionally, the transform/quantization unit 103 may generate transform coefficient information based on the generated transform coefficient.

The inverse quantization/inverse transform unit 104 may inversely quantize the residual image quantized by the transform/quantization unit 103, may perform an Inverse Discrete Cosine Transform (IDCT) on the inverse-quantized residual image, and may restore the residual image to a state prior to encoding, in order to use the residual image in prediction of an image that is to be encoded at the next time.

The addition unit 105 may restore the current image to a state prior to encoding, using the restored residual image and the predicted image. For example, the addition unit 105 may add the restored residual image and the predicted image, and may restore the current image.

The block information generator 106 may generate skip mode information based on the coded block pattern, namely, the subtraction result value obtained by the subtraction unit 102. In an example in which a value of the coded block pattern is equal to or less than a reference pattern value, the block information generator 106 may determine that the current image is in the skip mode, and may generate skip mode information. In another example in which the value of the coded block pattern is greater than the reference pattern value, the block information generator 106 may determine that the current image is not in the skip mode, and may not generate skip mode information. The skip mode information may include, for example, a P_skip mode, and a B_skip mode.

Additionally, the block information generator 106 may generate block information. The block information may include at least one of skip mode information, reference image information, motion information, transform coefficient information, and weight information. For example, when the current image includes a plurality of macroblocks, the block information generator 106 may generate block information for each of the plurality of macroblocks. In this example, each of the plurality of macroblocks may include a plurality of sub-blocks.

The entropy encoding unit 107 may entropy-encode the block information. The entropy-encoded block information may be inserted in a bitstream, and the bitstream may be transmitted to an image restoration apparatus. The bitstream may include an coded current image.

Figure 2:
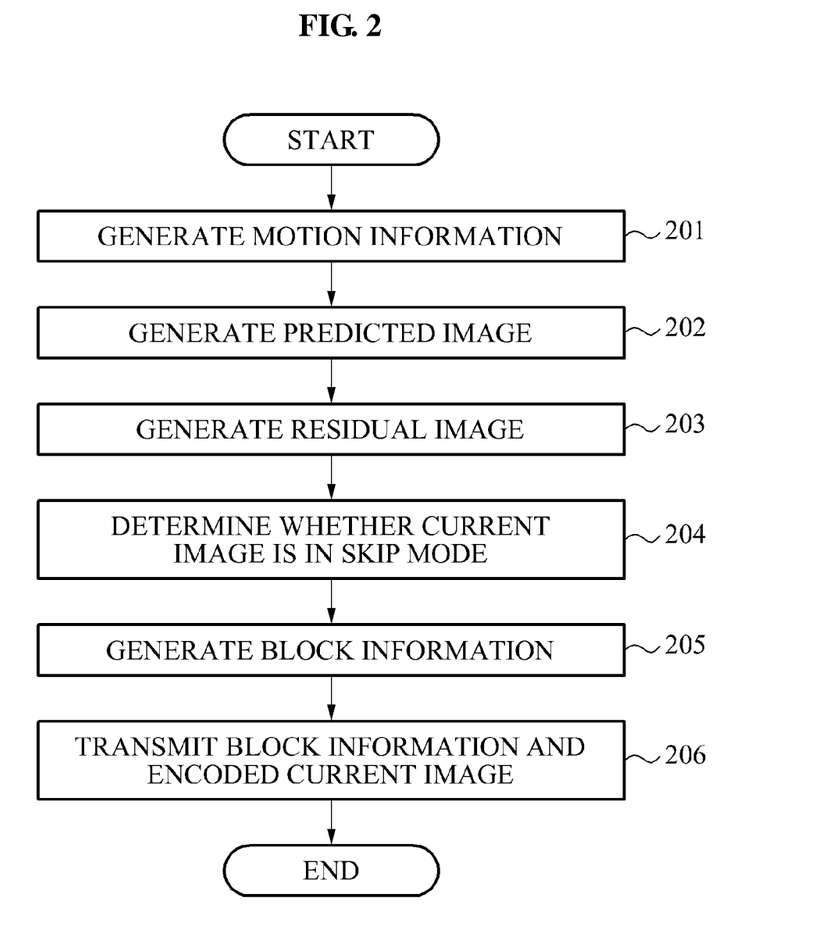
FIG. 2 is a flowchart of an image coding method according to example embodiments.

FIG. 2 is a flowchart of an image coding method according to example embodiments. The image coding method of FIG. 2 may be performed by the image coding apparatus 100 of FIG. 1.

In FIG. 2, in operation 201, the image coding apparatus 100 may generate motion information of a current image, based on the current image and a reference image. The motion information may include, for example, a motion vector.

In operation 202, the image coding apparatus 100 may generate a predicted image, namely a prediction value of the current image, based on the motion information and the reference image.

In operation 203, the image coding apparatus 100 may generate a residual image based on the current image and the reference image. For example, the image coding apparatus 100 may subtract the reference image from the current image, and may generate a residual image. In this example, the current image may include a plurality of macroblocks.

In operation 204, the image coding apparatus 100 may determine whether the current image is in the skip mode.

Specifically, the image coding apparatus 100 may determine whether the current image is in the skip mode, based on a subtraction result value obtained by subtracting the reference image from the current image. Additionally, a coded block pattern may be used as the subtraction result value. In an example in which a value of the coded block pattern is equal to or less than a reference pattern value, the image coding apparatus 100 may determine that the current image is in the skip mode. In other words, the coded block pattern with the value equal to or less than the reference pattern value may indicate that the predicted image may be similar to or the same as the current image. In another example in which the value of the coded block pattern is greater than the reference pattern value, the image coding apparatus 100 may determine that the current image is not in the skip mode. Additionally, the image coding apparatus 100 may generate skip mode information of the current image, based on a result of determining whether the current image is in the skip mode.

In operation 205, the image coding apparatus 100 may generate block information of the current image. The block information may include at least one of skip mode information, motion information, reference image information, weight information, and transform coefficient information that are associated with the current image.

For example, when the current image includes a plurality of macroblocks, the image coding apparatus 100 may generate block information for each of the plurality of macroblocks. In this example, each of the plurality of macroblocks may include a plurality of sub-blocks.

In operation 206, the image coding apparatus 100 may transmit a coded current image, and the block information to an image restoration apparatus. Specifically, the coded current image and the block information may be transmitted in the form of a bitstream.

Figure 3:
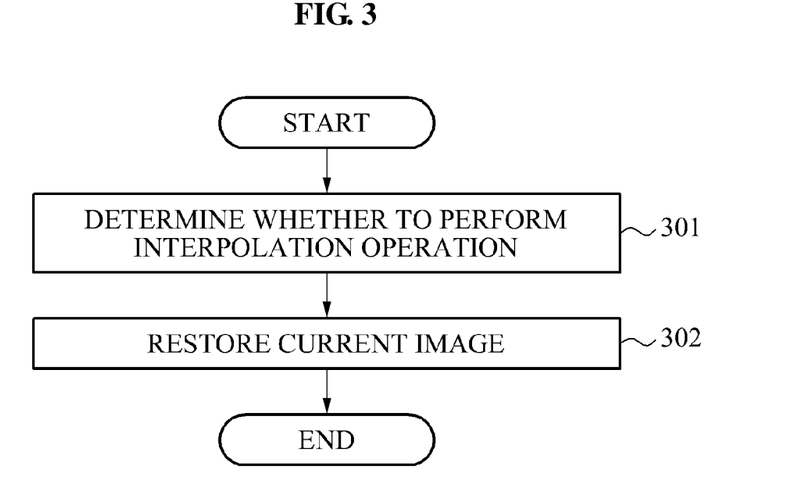
FIG. 3 is a flowchart of a method of restoring an image by copying a memory according to example embodiments.

FIG. 3 is a flowchart of a method of restoring an image by copying a memory according to example embodiments. The method of FIG. 3 may be performed by an image restoration apparatus 500 of FIG. 5.

In FIG. 3, in operation 301, the image restoration apparatus 500 may determine whether to perform an interpolation operation, based on block information of a current image. The interpolation operation may include an operation required to generate a predicted block through motion estimation, an operation required to load a reference image, an operation required to apply a weight, and an operation required to generate a residual image.

The current image may include a plurality of macroblocks. Additionally, the block information may include at least one of motion information, weight information, skip mode information, reference image information, and transform coefficient information that are associated with the current image. For example, the image restoration apparatus 500 may determine whether to perform the interpolation operation, based on the motion information, the weight information, and the skip mode information.

In operation 302, the image restoration apparatus 500 may restore the current image, based on a result of operation 301.

Specifically, depending on whether to perform the interpolation operation, the image restoration apparatus 500 may either skip or perform the operations included in the interpolation operation, and may restore the current image.

In an example in which it is determined not to perform the interpolation operation, the image restoration apparatus 500 may copy a reference image stored in a memory to the current image. For example, the image restoration apparatus 500 may copy pixel values corresponding to the reference image to a memory address of the reference image assigned in the memory, and may restore the current image.

In this example, the image restoration apparatus 500 may restore the current image, by copying the reference image, instead of performing the operations in the interpolation operation.

Accordingly, to restore the current image by copying the reference image, a Digital Signal Processor (DSP) in an image restoration apparatus may not need to perform the interpolation operation. Thus, it is possible to reduce a memory bandwidth of the DSP.

In another example in which it is determined to perform the interpolation operation, the image restoration apparatus 500 may load the reference image based on the reference image information, and may generate a predicted image based on the reference image and motion information. Additionally, the image restoration apparatus 500 may restore the current image using the predicted image, and a residual image that is acquired by inversely quantizing and inversely transforming a bitstream received from an image coding apparatus.

Figure 4:
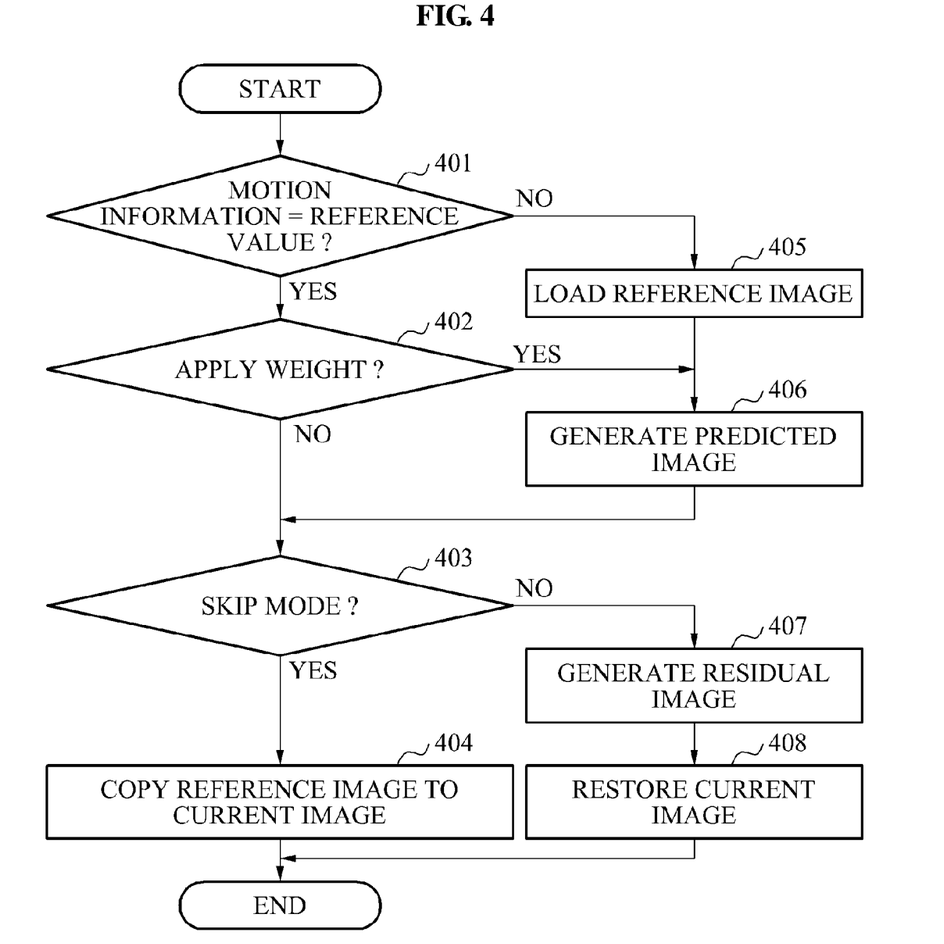
FIG. 4 is a flowchart of a method of determining whether to perform an interpolation operation using block information according to example embodiments.

FIG. 4 is a flowchart of a method of determining whether to perform an interpolation operation using block information according to example embodiments. The method of FIG. 4 may be performed by the image restoration apparatus 500 of FIG. 5.

Referring to FIG. 4, in operation 401, the image restoration apparatus 500 may determine whether to load a reference image, using motion information included in the block information and a reference value. For example, the reference value may be set in advance to a multiple of an integer, and the motion information may include a motion vector.

In an example in which a motion vector is set to a multiple of an integer, the image restoration apparatus 500 may decide not to load the reference image. In this example, the motion vector set to the multiple of the integer may indicate that a pixel value corresponding to the motion vector is already stored. In other words, when a pixel value corresponding to the motion information is already stored, the image restoration apparatus 500 may decide not to load the reference image. Additionally, the image restoration apparatus 500 may continue to determine whether to perform the interpolation operation, based on weight information and skip mode information. In another example in when the motion vector is not set to the multiple of the integer, the image restoration apparatus 500 may load a reference image stored in a memory in operation 405.

In operation 402, the image restoration apparatus 500 may determine whether to apply a weight to the current image, based on weight information included in the block information.

For example, when the weight information indicates "0," or the same weight, the image restoration apparatus 500 may decide not to apply the weight. In this example, when a single reference image exists, the weight information may indicate "0." Additionally, when two reference images exist, the same weight may be applied to the two reference images. For example, when "n" reference images exist, the same weight "m" may be applied to the "n" reference images.

When the weight information indicates different weights, such as n and k, the image restoration apparatus 500 may decide to apply the weight.

In operation 403, the image restoration apparatus 500 may determine whether to generate a residual image, based on skip mode information. Since the skip mode information may be generated based on a coded block pattern, the image restoration apparatus 500 may determine whether to generate a residual image, based on the coded block pattern, instead of the skip mode information.

In an example in which the current image is determined to be in the skip mode, the image restoration apparatus 500 may decide not to generate a residual image. Conversely, when the current image is determined not to be in the skip mode, the image restoration apparatus 500 may decide to generate a residual image.

In another example in which a value of the coded block pattern is "0," or is equal to or less than a reference pattern value, the image restoration apparatus 500 may decide not to generate a residual image. In other words, the image restoration apparatus 500 may decide to skip generating of a residual image and to restore the current image. When the value of the coded block pattern is greater than the reference pattern value, the image restoration apparatus 500 may decide to generate a residual image.

In operation 404, the image restoration apparatus 500 may copy the reference image to the current image, based on reference image information and motion information. For example, the image restoration apparatus 500 may copy a pixel value corresponding to the reference image to a memory address of the current image assigned in the memory. In this example, the image restoration apparatus 500 may move pixel values corresponding to the reference image based on the motion information, and may copy the pixel values to the memory address of the current image.

Accordingly, the image restoration apparatus 500 may determine whether to perform the interpolation operation, based on the motion information, the weight information, and the skip mode information. Specifically, when it is determined that the motion information corresponds to a reference value within an error margin that is set in advance, when it is determined not to apply the weight, and when the current image is determined to be in the skip mode, the image restoration apparatus 500 may decide not to perform the interpolation operation. Additionally, the image restoration apparatus 500 may restore the current image by copying the reference image, without performing an operation on pixel values forming the reference image. Thus, the image restoration apparatus 500 may reduce a bandwidth of the memory, by restoring the current image without performing the interpolation operation.

When it is determined to apply the weight in operation 402, the image restoration apparatus 500 may apply the weight to reference images based on the weight information, and may generate a predicted image using the motion information and the reference images, to which the weight is applied, in operation 406.

Subsequently, when it is determined that the current image is not in the skip mode in operation 403, the image restoration apparatus 500 may generate a residual image based on transform coefficient information in operation 407. In operation 408, the image restoration apparatus 500 may restore the current image using the residual image and the predicted image.

As described above, when no requirements that the motion information corresponds to the reference value within the error margin, that the weight is not applied, and that the current image is in the skip mode are satisfied, an image restoration apparatus according to example embodiments may load a reference image, may generate a predicted image and a residual image, and may restore a current image using the residual image and the predicted image. In other words, when it is determined to perform the interpolation operation, the image restoration apparatus may perform an operation required to load a reference image, an operation required to apply a weight, an operation required to generate a predicted image, and an operation required to generate a residual image, so as to restore the current image.

Figure 5:
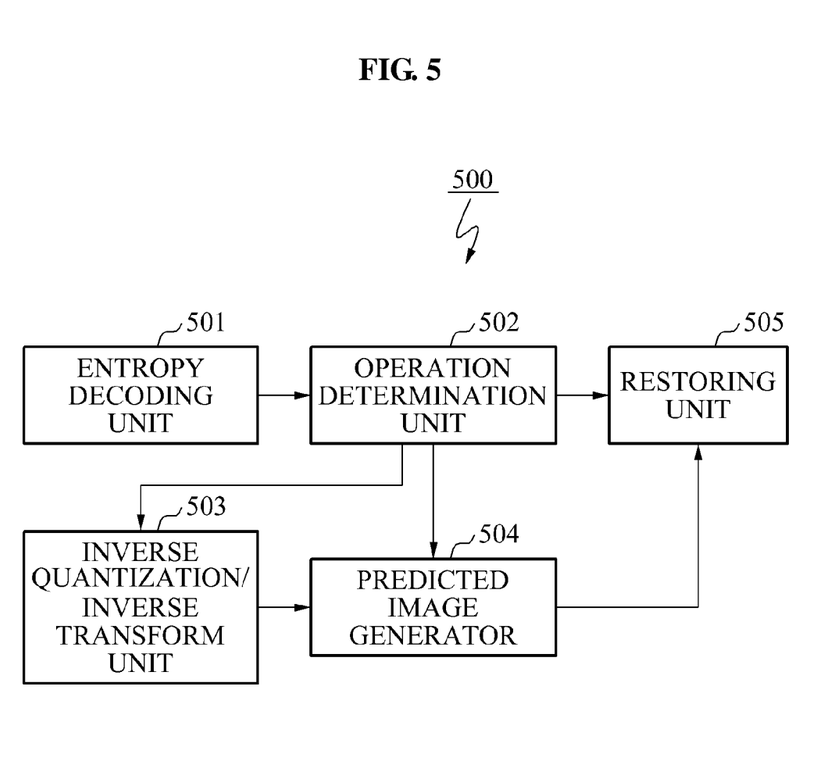
FIG. 5 is a block diagram of a configuration of an image restoration apparatus according to example embodiments.

FIG. 5 is a block diagram of a configuration of the image restoration apparatus 500 according to example embodiments.

The image restoration apparatus 500 of FIG. 5 may include an entropy decoding unit 501, an operation determination unit 502, an inverse quantization/inverse transform unit 503, a predicted image generator 504, and a restoring unit 505.

The entropy decoding unit 501 may entropy-decode a bitstream received from an image coding apparatus, and may extract block information from the entropy-decoded bitstream. The block information may include at least one of reference image information, skip mode information, weight information, motion information, and transform coefficient information that are associated with the current image.

The operation determination unit 502 may determine whether to perform an interpolation operation based on the block information. The interpolation operation may include an operation required to load a reference image, an operation required to apply a weight, an operation required to generate a predicted image, and an operation required to generate a residual image.

Specifically, the operation determination unit 502 may determine whether to skip or perform the operations included in the interpolation operation and to restore the current image, based on the motion information, the weight information, and the skip mode information.

For example, when a pixel value corresponding to the motion information is already stored, the operation determination unit 502 may determine whether to perform the interpolation operation, based on the weight information and the skip mode information. An example of determining whether to perform the interpolation operation will be further described with reference to FIG. 6.

The inverse quantization/inverse transform unit 503 may generate a residual image based on the transform coefficient information. For example, when the interpolation operation is determined to be performed, the inverse quantization/inverse transform unit 503 may inversely quantize the transform coefficient information, may perform the IDCT on the inverse-quantized transform coefficient information, and may generate a residual image.

The predicted image generator 504 may determine whether to load the reference image, based on the motion information and a reference value. Additionally, the predicted image generator 504 may determine whether to apply the weight, based on the weight information. For example, when it is determined not to apply the weight, the predicted image generator 504 may generate a predicted image using the reference image.

The restoring unit 505 may restore the current image, depending on whether to perform the interpolation operation.

In an example in which it is determined not to perform the interpolation operation, the restoring unit 505 may copy a reference image stored in a memory to the current image. Specifically, the restoring unit 505 may copy pixel values forming the reference image to a memory address of the current image assigned in the memory, based on the reference image information and the motion information. In other words, the restoring unit 505 may restore the current image by copying the reference image.

In another example in which it is determined to perform the interpolation operation, the restoring unit 505 may restore the current image using the predicted image and the residual image. Specifically, the restoring unit 505 may add the predicted image and the residual image, and may restore the current image.

Figure 6:
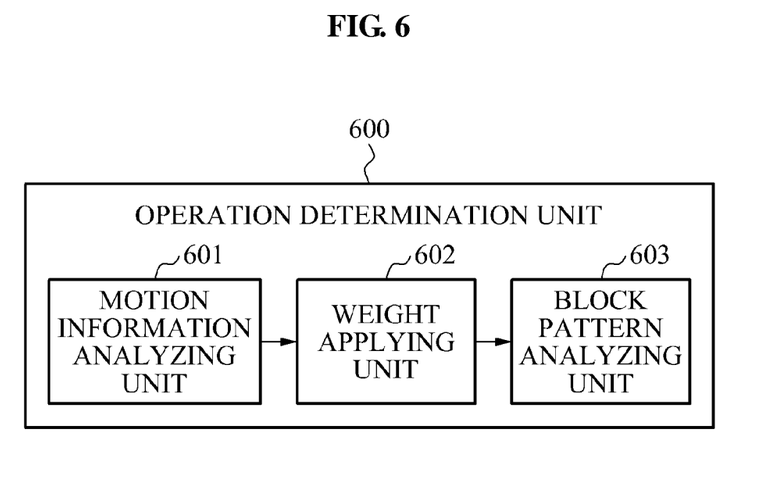
FIG. 6 is a block diagram of an example of an operation determination unit in the image restoration apparatus of FIG. 5.

FIG. 6 is a block diagram of an example of the operation determination unit 502 of FIG. 5.

Referring to FIG. 6, an operation determination unit 600 may include a motion information analyzing unit 601, a weight applying unit 602, and a block pattern analyzing unit 603.

The motion information analyzing unit 601 may determine whether motion information corresponds to a reference value within an error margin that is set in advance. Based on a result of the determining, the motion information analyzing unit 601 may determine whether to perform an operation of loading a reference image in the interpolation operation. The reference value may be set, in advance, to a multiple of an integer.

Additionally, when the motion information indicates a multiple of an integer, a pixel value corresponding to the motion information may refer to a pixel value that is already stored. Accordingly, when the motion information corresponds to the reference value, the motion information analyzing unit 601 may determine that the pixel value corresponding to the motion information is already stored, and may decide not to load the reference image.

Conversely, when the motion information does not correspond to the reference value, the motion information analyzing unit 601 may determine that the pixel value corresponding to the motion information is not stored, and that the pixel value corresponding to the motion information needs to be computed. Accordingly, to compute the pixel value corresponding to the motion information, the motion information analyzing unit 601 may load the reference image.

The weight applying unit 602 may determine whether to apply a weight to at least one reference image, based on weight information. Specifically, the weight applying unit 602 may determine whether to perform an operation of applying a weight in the interpolation operation, based on the weight information.

In an example in which the motion information corresponds to the reference value within the error margin, and in which the weight information indicates "0" or the same weight, the weight applying unit 602 may decide not to apply the weight. In this example, when a single reference image exists, the weight information may indicate "0." Additionally, when two reference images exist, the same weight may be applied to the two reference images. For example, when "n" reference images exist, the same weight "m" may be applied to the "n" reference images.

In another example in which the motion information corresponds to the reference value within the error margin, and in which weight information indicates different weights, the weight applying unit 602 may decide to apply the weight. The weight applying unit 602 may apply different weights to reference images, and may generate a predicted image using the motion information and the reference images to which the different weights are applied.

In still another example in which the motion information does not correspond to the reference value within the error margin, the weight applying unit 602 may decide to apply the weight, except for an example in which the weight information indicates "0." Specifically, when the weight information indicates "0," the weight applying unit 602 may not apply the weight, since a single reference image exists. Additionally, when the weight information indicates the same weight or different weights, the weight applying unit 602 may apply the same weight or different weights to reference images.

The block pattern analyzing unit 603 may determine whether to generate a residual image based on skip mode information. The skip mode information may be generated based on a coded block pattern by an image coding apparatus. Accordingly, the block pattern analyzing unit 603 may determine whether to generate a residual image based on the coded block pattern instead of the skip mode information.

Specifically, the block pattern analyzing unit 603 may determine whether a value of the coded block pattern is equal to or less than a reference pattern value, and may determine whether to skip an operation of generating a residual image in the interpolation operation and to restore the current image.

In an example in which it is determined not to apply a weight, and in which the value of the coded block pattern is equal to or less than the reference pattern value, the block pattern analyzing unit 603 may decide not to generate a residual image. The reference pattern value may be set, in advance, to an approximate value of "0."

In another example in which 1) it is determined to apply a weight, or 2) it is determined not to apply a weight, and in which the value of the coded block pattern is greater than the reference pattern value, the block pattern analyzing unit 603 may decide to generate a residual image. Accordingly, the inverse quantization/inverse transform unit 503 of FIG. 5 may generate a residual image based on transform coefficient information.

As described above with reference to FIG. 6, when all requirements that the motion information corresponds to the reference value within the error margin, that the weight is not applied, and that the value of the coded block pattern is equal to or less than the reference pattern value are satisfied, the operation determination unit 600 may decide to restore the current image by skipping the interpolation operation. In other words, when all the requirements are satisfied, the operation determination unit 600 may decide to skip the operation required to load a reference image, the operation required to apply a weight, the operation required to generate a predicted image, and the operation required to generate a residual image. Accordingly, the restoring unit 505 of FIG. 5 may copy pixel values forming the reference image to a memory address of the current image assigned in the memory, and may restore the current image.

As described above, according to example embodiments, when pixel data of a reference image needs to be changed, an interpolation operation may be performed based on block information of a current image. Conversely, when there is no need to change the pixel data of the reference image, the interpolation operation may be skipped. Thus, it is possible to prevent a bandwidth of a DPS from being wasted when the interpolation operation is not substantially performed.

Additionally, according to example embodiments, it is possible to reduce a computation amount of a DSP, by restoring a current image by copying a reference image without performing an interpolation operation.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A method for restoring an image, the method comprising:
   determining whether to perform an interpolation operation based on block information of a current image;
   restoring the current image by copying a reference image to a memory address of the current image assigned in a memory based on a determination result, the reference image being stored in the memory; and
   wherein the determining further comprises:
   deciding whether to skip loading of the reference image, deciding whether to skip generating of a predicted image, and
   deciding whether to skip generating of a residual image and restoring of the current image, based on the block information.

2. The method of claim 1, wherein the block information comprises at least one of motion information, weight information, skip mode information, and reference image information that are associated with the current image.

3. The method of claim 2, wherein the restoring comprises copying the reference image to a memory address of the current image assigned in the memory, based on the reference image information and the motion information.

4. The method of claim 2, wherein the determining comprises determining whether to load the reference image based on the motion information and a reference value.

5. The method of claim 1, wherein the determining comprises:
   determining whether motion information of the current image corresponds to a reference value;
   determining whether to apply a weight to the current image based on weight information of the current image, when it is determined that the motion information corresponds to the reference value;
   determining whether a value of a coded block pattern corresponding to skip mode information of the current image is equal to or less than a reference pattern value, when it is determined not to apply the weight; and
   deciding to skip the interpolation operation of the current image and to restore the current image, when it is determined that the value of the coded block pattern is equal to or less than the reference pattern value.

6. A non-transitory computer readable recording medium storing a program to cause a computer to implement the method of claim 1.

7. A method for restoring an image, the method comprising:
   determining whether to perform an interpolation operation based on block information of a current image; and
   restoring the current image by copying a reference image to the current image based on a determination result, the reference image being stored in a memory,
   wherein the determining comprises, when a pixel value corresponding to motion information of the current image is already stored, determining whether to perform the interpolation operation based on weight information and skip mode information that are associated with the current image.

8. The method of claim 7, wherein the skip mode information is generated based on a coded block pattern of the current image, and
   wherein the determining comprises determining whether to generate a residual image based on the coded block pattern and a reference pattern value.

9. The method of claim 8, wherein the determining comprises, when a value of the coded block pattern is equal to or less than the reference pattern value, deciding to skip generating of the residual image, and to restore the current image.

10. An apparatus for restoring an image, the apparatus comprising:
    at least one computer which acts as:
    an operation determination unit to determine whether to perform an interpolation operation based on block information of a current image;
    a memory to store the current image and a reference image associated with the current image;

a restoring unit to restore the current image by copying the stored reference image to a memory address of the current image assigned in the memory based on a determination result; and wherein the operation determination unit decides to skip loading of the reference image, to skip generating of a predicted image, to skip applying of a weight, to skip generating of a residual image, and to restore the current image, based on the block information.

11. The apparatus of claim 10, wherein the block information comprises at least one of motion information, weight information, skip mode information, and reference image information that are associated with the current image.

12. The apparatus of claim 11, wherein the restoring unit copies the reference image to a memory address of the current image assigned in the memory, based on the reference image information and the motion information.

13. The apparatus of claim 11, wherein the operation determination unit determines whether to load the reference image based on the motion information and a reference value.

14. The apparatus of claim 10, wherein the operation determination unit comprises:

a motion information analyzing unit to determine whether motion information of the current image corresponds to a reference value;

a weight applying unit to determine whether to apply a weight to the current image based on weight information of the current image, when it is determined that the motion information corresponds to the reference value; and a block pattern analyzing unit to determine whether a value of a coded block pattern corresponding to skip mode information of the current image is equal to or less than a reference pattern value, when it is determined not to apply the weight, and to determine whether to skip the interpolation operation of the current image and to restore the current image, based on a result of determining whether the value of the coded block pattern is equal to or less than the reference pattern value.

15. An apparatus for restoring an image, the apparatus comprising:

at least one computer which acts as;

an operation determination unit to determine whether to perform an interpolation operation based on block information of a current image;

a memory to store the current image and a reference image associated with the current image; and a restoring unit to restore the current image by copying the stored reference image to the current image based on a determination result, wherein, when a pixel value corresponding to motion information of the current image is already stored, the operation determination unit determines whether to perform the interpolation operation based on weight information and skip mode information that are associated with the current image.

16. The apparatus of claim 15, wherein the skip mode information is generated based on a coded block pattern of the current image, and wherein the operation determination unit determines whether to generate a residual image based on the coded block pattern and a reference pattern value.

17. The apparatus of claim 16, wherein, when a value of the coded block pattern is equal to or less than the reference pattern value, the operation determination unit decides to skip generating of the residual image, and to restore the current image.

* * * * *